(12) United States Patent
Kusumoto

(10) Patent No.: US 7,206,158 B2
(45) Date of Patent: Apr. 17, 2007

(54) DISK DRIVE FOR QUICKLY RETRACTING HEAD TO RETRACT AREA, AND EMERGENCY HEAD-UNLOAD CONTROL CIRCUIT FOR USE IN THE DISK DRIVE

(75) Inventor: Tatsuharu Kusumoto, Higashiyamato (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 268 days.

(21) Appl. No.: 11/038,049

(22) Filed: Jan. 21, 2005

(65) Prior Publication Data
US 2005/0264914 A1  Dec. 1, 2005

(30) Foreign Application Priority Data
May 31, 2004  (JP) ............................. 2004-161417

(51) Int. Cl.
G11B 21/02 (2006.01)
(52) U.S. Cl. ..................................... 360/75
(58) Field of Classification Search .................. 360/75, 360/60, 69, 31, 70, 55, 78.01
See application file for complete search history.

(56) References Cited

U.S. PATENT DOCUMENTS

| | | | |
|---|---|---|---|
| 6,396,652 B1 * | 5/2002 | Kawachi et al. | 360/75 |
| 6,580,574 B1 * | 6/2003 | Codilian | 360/60 |
| 6,594,102 B1 | 7/2003 | Kanda et al. | |
| 6,738,214 B2 * | 5/2004 | Ishiyama et al. | 360/75 |
| 6,771,447 B2 * | 8/2004 | Watanabe et al. | 360/69 |
| 6,937,417 B2 * | 8/2005 | Nagaki et al. | 360/75 |
| 7,075,745 B2 * | 7/2006 | Kaneko et al. | 360/75 |
| 7,145,742 B2 * | 12/2006 | Brenden et al. | 360/75 |
| 2005/0088773 A1 * | 4/2005 | Yoshida | 360/75 |

FOREIGN PATENT DOCUMENTS

| | | |
|---|---|---|
| JP | 2536985 | 7/1996 |
| JP | 2000-21073 | 1/2000 |
| JP | 2000-076772 | 3/2000 |

OTHER PUBLICATIONS

Austrian Search Report dated Oct. 12, 2006 for Appln. No. 200500251-4.
Williams, R.K. et al.; A fully integrated HDD power IC with novel head retract feature; Proceeding of the 6th International Symposium on Power Semiconductor Decices and IC's; May 31-Jun. 2, 1994; pp. 391-396.

* cited by examiner

Primary Examiner—Fred F. Tzeng
(74) Attorney, Agent, or Firm—Pillsbury Winthrop Shaw Pittman, LLP

(57) ABSTRACT

A reset circuit asserts a reset signal when at least a power-off detection signal or a drop detection signal is asserted. When the reset signal is asserted, an emergency unload circuit supplies a voice coil motor with a current for retracting the head to the retract area. The emergency unload circuit uses an auxiliary power supply as an operation power supply thereof.

21 Claims, 4 Drawing Sheets

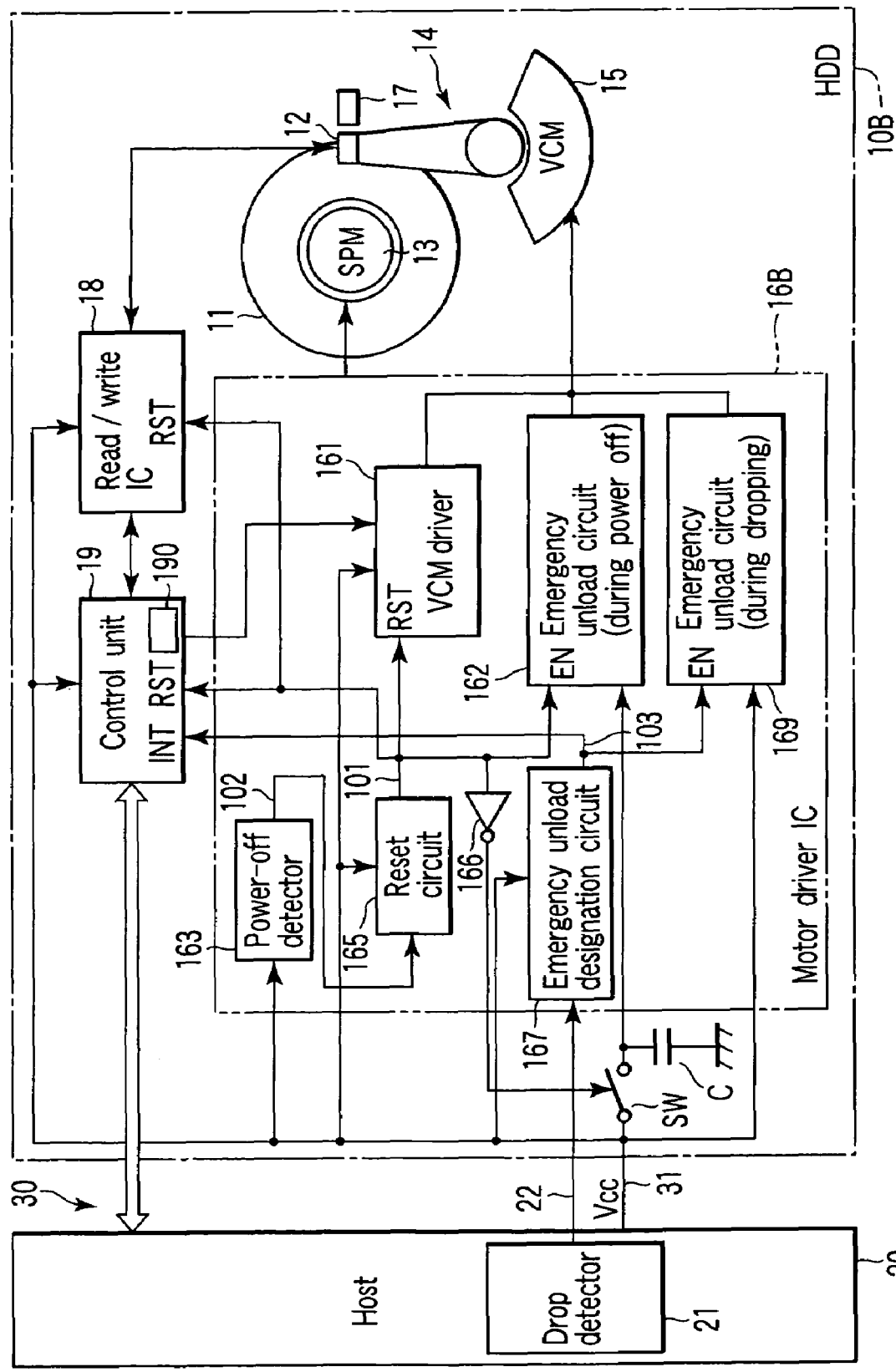
F I G. 5 ically to a disk drive and emergency head-unload control circuit suitable for quickly retracting (unloading) a head to a retract area when the drive is dropped.
DISK DRIVE FOR QUICKLY RETRACTING HEAD TO RETRACT AREA, AND EMERGENCY HEAD-UNLOAD CONTROL CIRCUIT FOR USE IN THE DISK DRIVE

CROSS-REFERENCE TO RELATED APPLICATIONS

This application is based upon and claims the benefit of priority from prior Japanese Patent Application No. 2004-161417, filed May 31, 2004, the entire contents of which are incorporated herein by reference.

BACKGROUND OF THE INVENTION

1. Field of the Invention

The present invention relates to a disk drive in which a head reads and writes data from and to a disk, and more particularly to a disk drive and emergency head-unload control circuit suitable for quickly retracting (unloading) a head to a retract area when the drive is dropped.

2. Description of the Related Art

Hard disk drives (HDDs) are well known as typical disk drives in which a head reads and writes data from and to a disk. HDDs have recently been made compact. For instance, HDDs used as storage for notebook-type personal computers (portable computers) are mainly 2.5-inch HDDs. Further, 1.8-inch, 1-inch and even 0.85-inch HDDs have appeared. In accordance with reduction of HDD size, various portable electronic devices (hosts) have also appeared. In those small-size electronic devices, there is an increasing danger that users may unintentionally drop them. If a user drops their electronic device in use, the head may well collide with the disk thereby damaging the head and/or disk.

In light of the above, Japanese Patent No. 2536985 discloses a technique for retracting the head to a retract area by executing a predetermined routine using a dedicated processor or central processing unit (CPU), when an electronic device with an HDD, such as a portable computer, is dropped. This technique can prevent the head from colliding with the disk when the electronic device is dropped, thereby protecting the head and disk from damage.

To prevent the head and disk from being damaged because of dropping, it is necessary for the electronic device to execute a predetermined program to unload the head within a period shorter than the period required for the electronic device to drop. However, not all electronic devices with HDDs installed can execute such a program at high speed.

Furthermore, the head and/or disk of an HDD may be damaged for a reason other than the drop of an electronic device with the HDD. For instance, also when the supply of power to an HDD (or an electronic device with the HDD) is interrupted during the operation of the HDD, the head and/or disk may be damaged. Jpn. Pat. Appln. KOKAI Publication No. 2000-21073 discloses a technique for using a capacitor, charged with electricity, for quickly retracting the head to a retract area when power from the power supply is interrupted. This technique, however, does not consider the problem that occurs during dropping an electronic device with an HDD.

BRIEF SUMMARY OF THE INVENTION

In accordance with an embodiment of the invention, there is provided a disk drive provided with a retract area to which a head is retracted, the head being used to read and write data from and to a disk. The disk drive comprises: an actuator supporting the head such that the head is movable in a radial direction of the disk; a voice coil motor driver which drives a voice coil motor used as a drive source for the actuator; a reset circuit configured to assert a reset signal used to reset a predetermined element in the disk drive when at least one of a power-off detection signal and a drop detection signal is asserted, the power-off detection signal indicating detection of interruption of supply of power to the disk drive, the drop detection signal indicating detection of a dropping state of the disk drive, the predetermined element including the voice coil motor driver; an auxiliary power supply independent of a power supply for the disk drive; and an emergency unload circuit configured to supply the voice coil motor with a current for retracting the head to the retract area, when the reset signal is asserted, the emergency unload circuit using the auxiliary power supply as an operation power supply thereof.

A disk drive according to another embodiment of the invention further comprises an emergency unload designation circuit configured to assert an emergency unload designation signal when a drop detection signal indicating detection of a dropping state of the disk drive is asserted. In this case, a reset circuit different from the above-described one is employed, which is configured to assert a reset signal used to reset a predetermined element in the disk drive when a power-off detection signal indicating detection of interruption of supply of power to the disk drive is asserted, the predetermined element including the voice coil motor driver. Further, an emergency unload circuit different from the above-described one is employed, which is configured to be operative when at least one of the reset signal and the emergency unload designation signal is asserted, thereby supplying the voice coil motor with a current for retracting the head to the retract area. This emergency unload circuit uses the auxiliary power supply as an operation power supply thereof when the reset signal is asserted, and uses the power supply for the disk drive as the operation power supply when the reset signal is negated.

A disk drive according to yet another embodiment of the invention employs first and second emergency unload circuits corresponding to the above-described emergency unload circuit. The first emergency unload circuit is configured to supply the voice coil motor with a current for retracting the head to the retract area, when the reset signal is asserted. The first emergency unload circuit uses the auxiliary power supply as an operation power supply thereof. On the other hand, the second emergency unload circuit is configured to supply the voice coil motor with a current for retracting the head to the retract area, when the emergency unload designation signal is asserted. The second emergency unload circuit uses the power supply for the disk drive as an operation power supply thereof.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 5 is a block diagram illustrating the configuration of a hard disk drive according to a second modification of the embodiment.

DETAILED DESCRIPTION OF THE INVENTION

Figure 1:
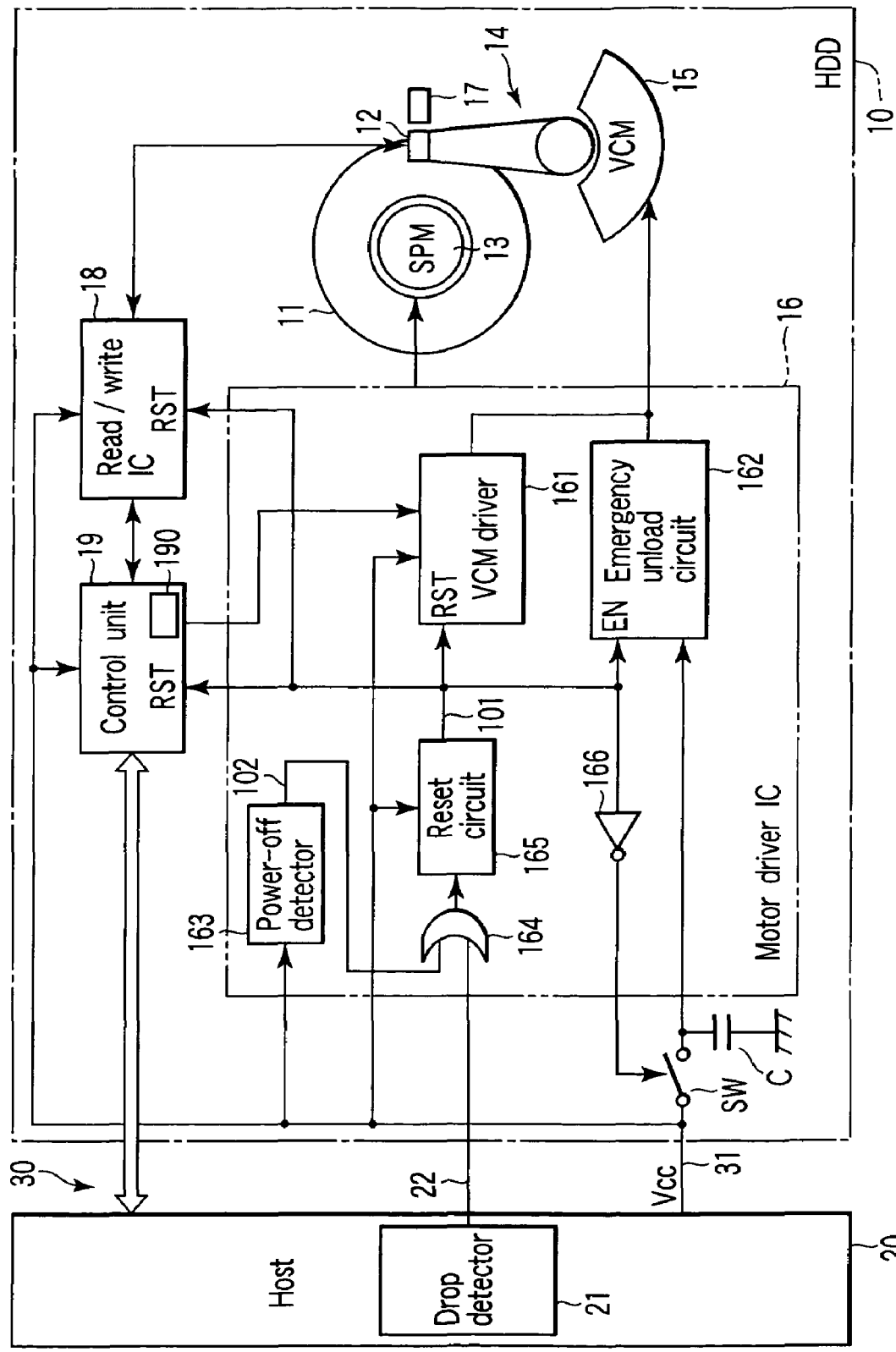
FIG. 1 is a block diagram illustrating the configuration of a hard disk drive (HDD) according to an embodiment of the invention.

An embodiment of the invention will be described in detail with reference to the accompanying drawings. FIG. 1 is a block diagram illustrating the configuration of a hard disk drive (HDD) 10 according to an embodiment of the invention. As shown, the HDD 10 is connected to a host 20 via a host interface 30. The host interface 30 includes a power supply line 31. A power supply voltage Vcc used to operate the HDD 10 is supplied from the host 20 via the power supply line 31. The host 20 uses the HDD 10 as its storage. Assume here that the host 20 is a portable electronic device, such as a portable computer, portable terminal, etc. The host 20 incorporates a drop detector 21 for detecting drop of the host 20 using an acceleration sensor (zero-gravity sensor). The drop detector 21 asserts a drop detection signal 22 indicating drop of the host 20, based on the sensing result of the acceleration sensor. The drop detection signal 22 is output to the HDD 10. In the embodiment, the HDD 10 is contained in the casing (not shown) of the host 20. Therefore, detection of the dropping state of the host 20 is equivalent to that of the drop of the HDD 10.

The HDD 10 has a disk 11 as a storage medium. The disk 11 has two disk surfaces, i.e., the upper and lower ones. The upper disk surface, for example, of the disk 11 serves as a recording surface on which data is magnetically recorded. A head (magnetic head) 12 is located corresponding to the recording surface of the disk 11. The head 12 is used to read and write data from and to the disk 11. FIG. 1 shows only one head 12 for facilitating the drawing. However, in general, the two surfaces of the disk 11 serve as recording surfaces, and respective heads are provided corresponding to the two recording surfaces. Further, it is assumed in the configuration shown in FIG. 1 that the HDD 10 includes a single disk 11. However, the HDD 10 may have a plurality of disks 11 that are stacked one on another.

The disk 11 is spun at high speed by a spindle motor (SPM) 13. The head 12 is attached to the tip of an actuator 14. The actuator 14 has a voice coil motor (VCM) 15 as a driving source. The actuator 14 is driven by the VCM 15 so that it radially moves over the disk 11. That is, the actuator 14 supports the head 12 so that the head 12 can radially move over the disk 11. By the movement of the actuator 14, the head 12 is positioned on a target track. The SPM 13 and VCM 15 are powered by respective currents supplied from the motor driver IC 16. The motor driver IC 16 will be described later in detail.

The disk 11 has an inner periphery and outer periphery. A ramp 17 is provided at a position away from the recording surface of the disk 11, e.g., near the outer periphery of the disk 11. The ramp 17 provides a retract area for retracting the head 12 in a period in which the HDD 10 is in an inoperative state. Assume here that the inoperative state includes a particular power-saving mode, as well as a state in which the HDD 10 is completely stopped.

The head 12 is connected to a read/write IC (read/write channel) 18 via a head amplifier circuit (head IC), not shown. The read/write IC 18 is a signal processing device for performing various types of signal processing, such as analog-to-digital conversion of a read signal, encoding of write data, decoding of read data, etc. The read/write IC 18 has a reset terminal RST for receiving a reset signal 101. The read/write IC 18 is connected to a control unit 19.

The control unit 19 controls various elements in the HDD 10 by executing a disk control program. The control unit 19 receives a command supplied from the host 20 via the host interface 30, and executes the command in accordance with the disk control program. The control unit 19 controls transfer of data from and to the disk 11 via the read/write IC 18, and from and to the host 20. The control unit 19 has a buffer memory 190 for storing data read from the disk 11 and to be transferred to the host 20, and storing data transferred from the host 20 and to be written to the disk 11. The control unit 19 also has a reset terminal RST for receiving reset signal 101.

The motor driver IC 16 comprises a VCM driver 161, emergency unload circuit 162, power-off detector 163, OR gate 164, reset circuit 165 and inverter 166. FIG. 1 does not show a SPM driver for driving the SPM 13, which is incorporated in the motor driver IC 16. The VCM driver 161 supplies the VCM 15 with a driving current (VCM current) of the amount designated by the control unit 19. The VCM driver 161 has a reset terminal RST for receiving reset signal 101.

The emergency unload circuit 162 quickly retracts the head 12 to the ramp (retract area) 17 when the supply of power to the HDD 10 (i.e., the supply of power to the host 20) is interrupted, and when the HDD 10 (i.e., the host 20) is dropped. The head-retracting (unloading) operation is realized by supplying a VCM current (hereinafter referred to as "the retract current") of a predetermined polarity from the emergency unload circuit 162 to the VCM 15. The emergency unload circuit 162 is connected to an end of a capacitor C. This end of the capacitor C is also connected to the power supply line 31 via a switch SW. The other end of the capacitor C is grounded. The capacitor C is charged with the power supply voltage Vcc via the power supply line 31. The emergency unload circuit 162 supplies the retract current to the VCM 15 using the capacitor C as a power supply. In other words, the emergency unload circuit 162 uses the capacitor C as a power supply for generating the retract current. The emergency unload circuit 162 has an enable terminal EN for receiving reset signal 101 as an enable signal.

The power-off detector 163 detects whether the supply of power to the HDD 10 (host 20) is interrupted. To this end, the power-off detector 163 monitors the power supply voltage Vcc applied via the power supply line 31. When the voltage Vcc is lower than a predetermined voltage, the power-off detector 163 asserts power-off detection signal 102 indicating power-off of the HDD 10 (host 20).

The OR gate 164 acquires the logical sum of power-off detection signal 102 output from the power-off detector 163, and drop detection signal 22 output from the drop detector 21 of the host 20. The reset circuit 165 asserts reset signal 101 if the output signal of the OR gate 164 assumes logic level "1" (true), i.e., if at least power-off detection signal 102 or drop detection signal 22 is asserted. The inverter 166 inverts the logic level of reset signal 101 output from the reset circuit 165. The output signal of the inverter 166 is used as a control signal for turning on and off a switch SW. The switch SW is a semiconductor switch formed of, for example, a field effect transistor (FET).

The operation of the embodiment will now be described. Assume here that the power-off detector 163 in the motor driver IC 16 has detected power-off of the HDD 10 (host 20), and asserted power-off detection signal 102. The OR gate 164 acquires the logical sum of power-off detection signal 102 output from the power-off detector 163, and drop detection signal 22 output from the drop detector 21 of the host 20. If power-off detection signal 102 is asserted as mentioned above, the output signal of the OR gate 164 assumes logic level "1" (true). If the output signal of the OR gate 164 assumes logic level "1", the reset circuit 165 asserts reset signal 101. That is, the reset circuit 165 outputs reset signal 101 of logic level "1". Reset signal of logic level "1" is input to the reset terminals RST of the read/write IC 18, control unit 19 and VCM deriver 161. As a result, the read/write IC 18, control unit 19 and VCM deriver 161 are reset.

Reset signal 101 output from the reset circuit 165 is also input to the enable terminal EN of the emergency unload circuit 162. When reset signal 101 input to the enable terminal EN is asserted (i.e. during a period of logic level "1"), the emergency unload circuit 162 is in an operative state. Thus, reset signal 101 is also used as an enable signal for the emergency unload circuit 162.

Reset signal 101 output from the reset circuit 162 is also input to the inverter 166. The inverter 166 inverts the logic level of reset signal 101. If reset signal 101 assumes logic level "1", the output signal of the inverter 166 assumes logic level "0". When the output signal of the inverter 166 assumes logic level "1", the switch SW is in the ON state (turned on). In other words, when reset signal 101 is not asserted, the switch SW is turned on. In this state, the power supply voltage Vcc is applied to the capacitor C via the power supply line 31 and switch SW. As a result, the capacitor C is charged with the power supply voltage Vcc. In contrast, when the output signal of the inverter 166 assumes logic level "0", the switch SW is OFF (turned off). In other words, when reset signal 101 is asserted, the switch SW is OFF.

Accordingly, if, as in the above case, the power-off detector 163 detects power-off of the HDD 10 (host 20), and therefore reset signal 101 is asserted, the switch SW is turned off. At this time, the emergency unload circuit 162 is set in the operative state as described above. In this state, the emergency unload circuit 162 uses the capacitor C as its power supply, thereby supplying the VCM 15 with the retract current for retracting the head 12 to the ramp 17. Thus, the capacitor C is an auxiliary power supply used when the supply of power to the HDD 10 (host 20) is interrupted. In the embodiment, however, the capacitor C is used as a power supply dedicated to the emergency unload circuit 162 for generating the retract current. The capacitor C is used as the power supply of the emergency unload circuit 162 also when the HDD 10 (host 20) is dropped. The VCM 15 is powered by the retract current supplied from the emergency unload circuit 162, thereby driving the actuator 14 to retract the head 12 on the disk 11 to the ramp 17. As a result, the head 12 is quickly retracted (unloaded) to the ramp 17.

As described above, in the embodiment, when the power-off detector 163 detects power-off of the HDD 10 (host 20), the VCM 15 is driven to retract the head 12 to the ramp 17. This operation is performed by the emergency unload circuit 162 that uses the capacitor C for generating the retract current. Since the retraction of the head 12 to the ramp 12 is executed without using any program, it can be performed quickly. This embodiment is characterized in that an operation for quickly retracting the head 12 to the ramp 17 by the emergency unload circuit 162 is performed not only when the power-off detector 163 detects the power-off state of the HDD 10 (host 20), but also when the drop detector 21 detects the dropping state of the HDD 10 (host 20).

Assume here that the drop detector 21 has detected the dropping state of the HDD 10 (host 20), and asserted drop detection signal 22. In this case, the output signal of the OR gate 164 assumes logic level "1" as in the case where power-off detection signal 102 is asserted, whereby the read/write IC 18, control unit 19 and VCM deriver 161 are reset.

Further, when reset signal 101 is asserted, the emergency unload circuit 162 becomes operative and the switch SW is turned off. As a result, the emergency unload circuit 162 uses the capacitor C as its power supply as in the above-described power-off detection case, and supplies the VCM 15 with the retract current for retracting (unloading) the head 12 to the ramp 17. The VCM 15, in turn, drives the actuator 14 to retract (unload) the head 12 on the disk 11 to the ramp 17. As a result, the head 12 is quickly retracted to the ramp 17.

As described above, when the drop detector 21 detects the dropping state of the HDD 10 (host 20), an operation for quickly retracting the head 12 to the ramp 17 is performed using the emergency unload circuit 162, in the same manner as when the power-off state is detected. In other words, the motor driver IC 16 serves as an emergency unload control circuit for quickly retracting (unloading) the head 12 to the ramp (retract area) 17. Moreover, in the embodiment, the OR gate 164 incorporated in the motor driver IC 16 enables the emergency unload circuit 162 for quickly retracting the head 12 to the ramp 17, and the capacitor C as an auxiliary power supply, etc., to be commonly used during detection of the power-off state and detection of the dropping state.

[First Modification]

In the above-described embodiment, the switch SW is turned off upon detection of the power-off state of the HDD (host) and detection of the dropping state of the same. When the switch SW is turned off, the voltage of the capacitor C is reduced with time. However, upon detection of the dropping state, the power supply voltage Vcc is applied to the HDD 10 from the host 20 via the power supply line 31, which differs from the power-off detection case. A first modification of the embodiment, which is directed to the case where the power supply voltage Vcc is used as that of the emergency unload circuit 162, will be described with reference to FIGS. 2–4.

Figure 2:
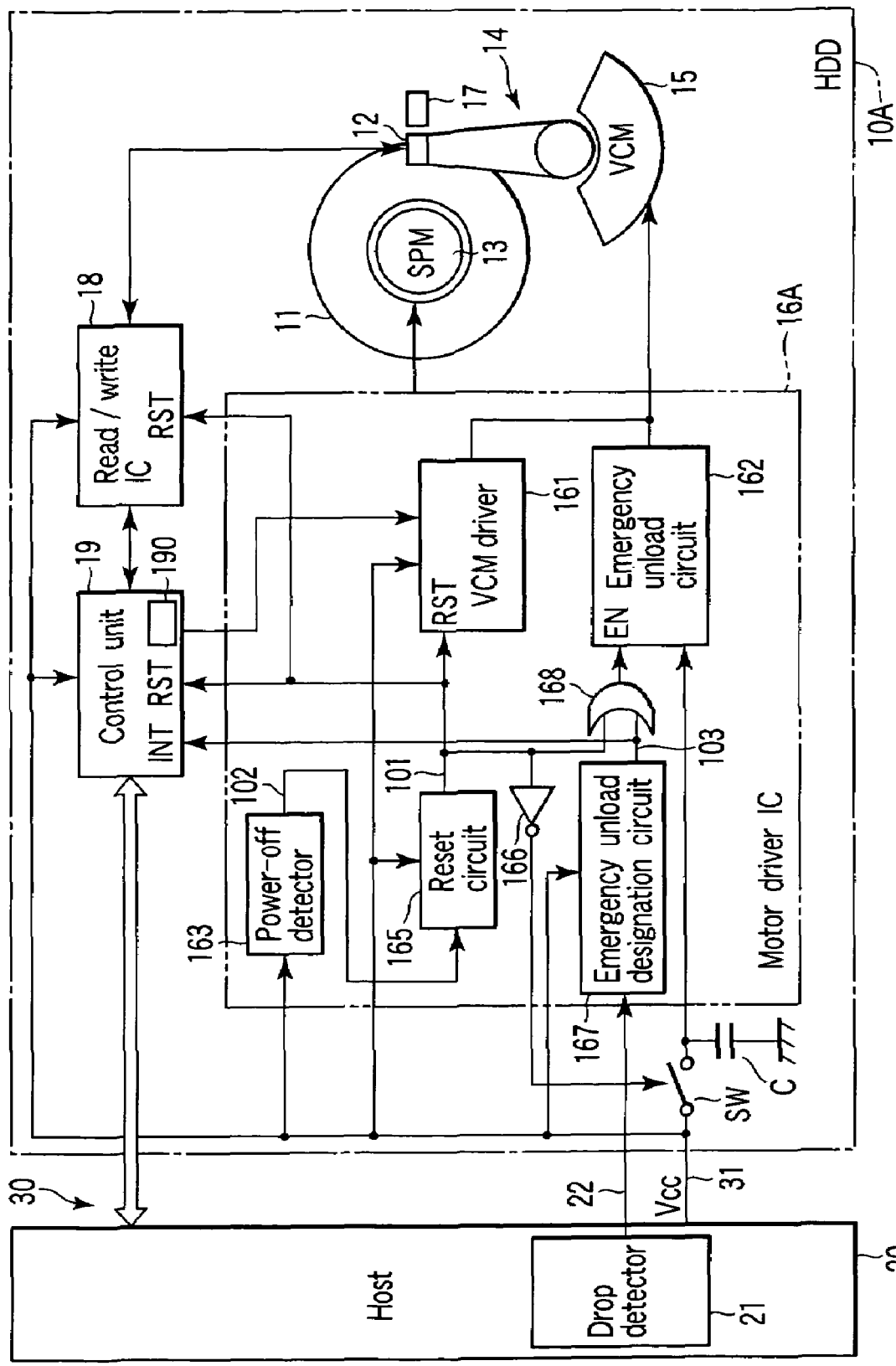
FIG. 2 is a block diagram illustrating the configuration of a hard disk drive according to a first modification of the embodiment.

FIG. 2 is a block diagram illustrating the configuration of a hard disk drive (HDD) according to the first modification. In FIG. 2, the elements similar to those of FIG. 1 are denoted by corresponding reference numerals. In the first modification, an HDD 10A is used instead of the HDD 10. The HDD 10A incorporates a motor driver IC 16A instead of the motor driver IC 16. The difference between the motor driver ICs 16 and 16A will be described.

In the motor driver IC 16A, power-off detection signal 102 is directly input from the power-off detector 163 to the reset circuit 165. Accordingly, the reset circuit 165 asserts reset signal 101 only when power-off detection signal 102 is asserted. Reset signal 101 is input to the inverter 166. The inverter 166 inverts the logic level of reset signal 101. The output signal of the inverter 166 is used as a control signal for turning on and off the switch SW as in the above-described embodiment. However, reset signal 101 input to the inverter 166 is asserted only when power-off detection signal 102 is asserted. Accordingly, the switch SW is turned off only when power-off detection signal 102 is asserted.

The motor driver IC 16A comprises an emergency unload designation circuit 167 and OR gate 168, in addition to the VCM driver 161, emergency unload circuit 162, power-off detector 163, reset circuit 165 and inverter 166. The emergency unload designation circuit 167 receives drop detection signal 22 output from the drop detector 21. The emergency unload designation circuit 167 asserts emergency unload designation signal 103 for, for instance, a preset period Tc if drop detection signal 22 assumes logic level "1" (true), i.e., if drop detection signal 22 is asserted. The emergency unload designation circuit 167 is formed of, for example, a one-shot multivibrator.

The OR gate 168 acquires the logical sum of reset signal 101 output from the reset circuit 165 and emergency unload designation signal 103 output from the emergency unload designation circuit 167. The output signal of the OR gate 168 is input to the enable terminal EN of the emergency unload circuit 162. The emergency unload circuit 162 becomes operative if the output signal of the OR gate 168 assumes logic level "1", i.e., if at least reset signal 101 or emergency unload designation signal 103 is asserted. In other words, the emergency unload circuit 162 is operative both upon detection of the power-off state and upon detection of the dropping state.

In the configuration of FIG. 2, the switch SW is OFF only when power-off detection signal 102 is asserted, as described above. That is, even if drop detection signal 22 is asserted, the switch SW is kept ON unless power-off detection signal 102 is not asserted. Accordingly, if drop detection signal 22 is asserted and hence emergency unload designation signal 103 is asserted by the emergency unload designation circuit 167, the emergency unload circuit 162 is operated by the power supply voltage Vcc applied thereto via the power supply line 31 and switch SW. As a result, the emergency unload circuit 162 can supply the VCM 15 with a sufficient amount of retract current upon drop detection, compared to the above-described embodiment in which the emergency unload circuit 162 is operated by the voltage corresponding to the electric charge accumulated in the capacitor C.

The emergency unload designation circuit 167 negates emergency unload designation signal 103 a period Tc after the assertion of the signal 103. As a result, the emergency unload circuit 162 is disabled, thereby stopping the operation of retracting the head 12 to the ramp 17. The period Tc is set to a value sufficient to reliably retract the head 12 to the ramp 17.

As shown in FIG. 2, the control unit 19 has an interruption terminal INT. The interruption terminal INT is omitted in the control unit 19 shown in FIG. 1. The interruption terminal INT of the control unit 19 receives emergency unload designation signal 103 as an interruption signal. When emergency unload designation signal 103 is asserted, the control unit 19 determines that there occurs an interruption, and performs interruption processing in accordance with an interruption routine. By interruption processing, the control unit 19 can recognize that a retracting (unloading) operation will be performed in accordance with the detection of dropping. Upon recognition, the control unit 19 stops, for example, the driving of the VCM 15 using the VCM driver 161.

It is possible that the dropping state of the HDD 10 (host 20) is detected during writing data to the disk 11. In this case, if head unloading is performed in response to drop detection by the drop detector 21, the content of a sector of the disk 11 to which the data is being written cannot be guaranteed. Referring now to the flowcharts of FIGS. 3 and 4, a description will be given of control performed by the control unit 19 for enabling data written during drop detection to be rewritten when the operation of the HDD 10 is resumed.

After starting interruption processing as mentioned above, the control unit 19 determines during interruption processing whether the cause of an interruption is drop detection (step S1). If the cause of the interruption is drop detection as mentioned above, i.e., if the interruption is caused by the execution of the head unload operation due to drop detection, the control unit 19 determines whether the interruption has occurred during writing data to the disk 11 (step S2). If it is determined that the interruption due to drop detection has occurred during writing data to the disk 11, the control unit 19 turns on a "rewrite" flag indicating that re-execution of data writing is needed (step S3). At this time, write data including data (sector data) being written to the disk 11 is stored in a buffer memory 190. Further, a pointer indicating the position, in the buffer memory 190, of sector data being written to the disk 11, address information indicating the position, on the disk 11, of each sector in which data is being written, and information indicating the size (i.e., the number of sectors) of data not yet written are held in respective registers (pointer register, address register and size register), not shown.

Assume that the operation of the HDD 10 is resumed after a head unloading operation due to drop detection is executed thereby to retract the head 12 to the ramp 17. The operation of the HDD 10 is resumed under the control of the control unit 19, after occurrence of an interruption due to drop detection is detected, and then the period Tc sufficient for the head 12 to be retracted to the ramp 17 elapses. Assume further that the head 12 is loaded from the ramp 17 onto the disk 11 under the control of the control unit 19 since the operation of the HDD 10 is resumed.

At this time, the control unit 19 refers to the "rewrite" flag and determines whether the flag is in the ON state (steps S11 and S12). Since in this case, the flag is in the ON state, the control unit 19 resumes writing of data to the disk 11 that was interrupted by the head unloading operation due to drop detection (step S13). More specifically, the control unit 19 performs write control for writing data in the region in the buffer memory 190 that starts at the position designated by the pointer held in the pointer register, to the region on the disk 11 starting at the sector position designated by the address information held in the address register. As a result, even if head unloading is performed during writing data in a sector, correct data can be restored in the sector without using the host 20. Successive data writing can also be executed without using the host 20.

[Second Modification]

In the first modification, the emergency unload circuit 162 can be used both for head unloading upon power-off detection and for that upon drop detection, as in the embodiment. In the first modification, however, the capacitor C is used as the power supply of the emergency unload circuit 162 upon power-off detection. Accordingly, it is impossible to enable the emergency unload circuit 162 to have a constant current source for supplying a constant retract current to the VCM 15. In contrast, a second modification of the embodiment can supply a constant retract current to the VCM 15 upon drop detection. The second modification will be described with reference to FIG. 5.

FIG. 5 is a block diagram illustrating the configuration of a hard disk drive (HDD) according to the second modification. In FIG. 5, elements similar to those of FIG. 2 are denoted by corresponding reference numerals. The second modification employs an HDD 10B instead of the HDD 10A in FIG. 2. In the HDD 10B, a motor driver IC 16B is used instead of the motor driver IC 16A. The motor driver IC 16B differs from the motor driver IC 16A in the following manner.

Firstly, in the motor driver IC 16B, reset signal 101 output from the reset circuit 165 is directly input to the terminal EN of the emergency unload circuit 162. In this case, reset signal 101 is asserted only when power-off detection signal 102 is asserted. Accordingly, the emergency unload circuit 162 is operative only upon power-off detection.

Figure 3:
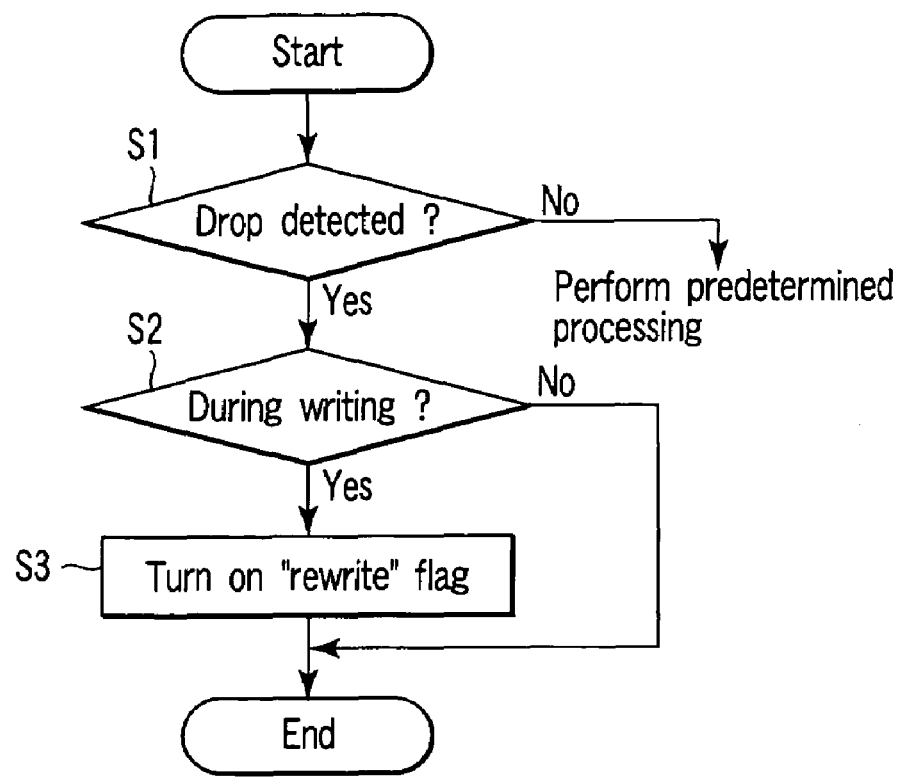
FIG. 3 is a flowchart useful in explaining the procedure of interruption processing in the first modification.
Figure 4:
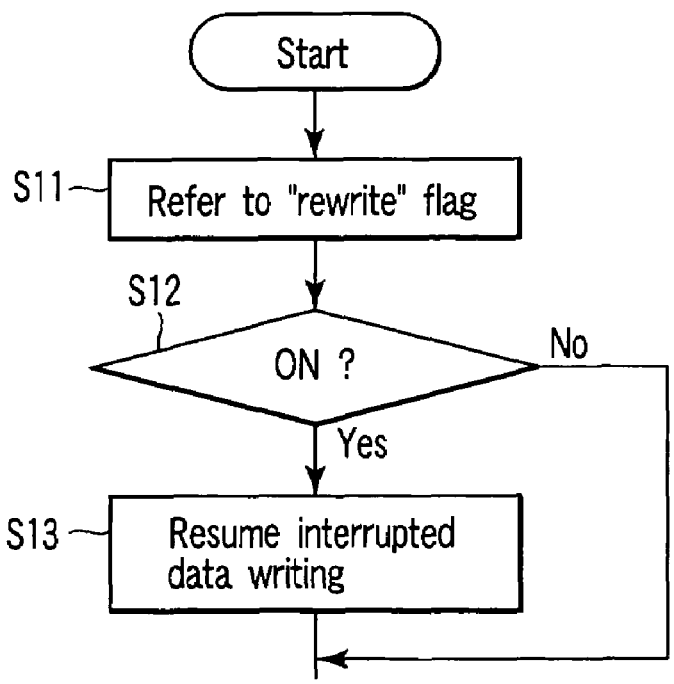
FIG. 4 is a flowchart useful in explaining the procedure of processing resumed after a head-unloading operation in the first modification.

The motor driver IC 16B further comprises an emergency unload circuit 169 that is operative only upon drop detection. The emergency unload circuit 169 has an enable terminal EN. The terminal EN of the emergency unload circuit 169 receives emergency unload designation signal 103 output from an emergency unload designation circuit 167. Only when emergency unload designation signal 103 is asserted, i.e., the dropping state of the HDD is detected, the emergency unload circuit 169 is operative. The power supply voltage Vcc is applied via the power supply line 31 to the emergency unload circuit 169. The emergency unload circuit 169 includes a constant current source (not shown) configured to generate a constant retract current using the power supply voltage Vcc. Accordingly, when the emergency unload circuit 169 is operative, it supplies a constant retract current to the VCM 15. By virtue of this structure, in the second modification, the head 12 can be retracted to the ramp 17 quickly and reliably upon drop detection. The operative state of the emergency unload circuit 169 continues for period Tc in which emergency unload designation signal 103 is asserted. From this point as well, the head 12 can reliably be retracted to the ramp 17. Also in the second modification, the processes as shown in the flowcharts of FIGS. 3 and 4 are executed.

In the above-described embodiment and modifications, the host 20 incorporates the drop detector 21. However, the HDD 10 may incorporate the drop detector 21. Further, the embodiment and modifications are directed to a hard disk drive (HDD) to which the present invention is applied. However, the present invention is also applicable to a disk drive other than the HDD, such as a magneto-optical disk drive. It is sufficient if the disk drive employs a retract area to which the head is retracted when the disk drive is inoperative.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A disk drive provided with a retract area to which a head is retracted, the head being used to read and write data from and to a disk, comprising:
   an actuator supporting the head such that the head is movable in a radial direction of the disk;
   a voice coil motor driver which drives a voice coil motor used as a drive source for the actuator;
   a reset circuit configured to assert a reset signal used to reset a predetermined element in the disk drive when at least one of a power-off detection signal and a drop detection signal is asserted, the power-off detection signal indicating detection of interruption of supply of power to the disk drive, the drop detection signal indicating detection of a dropping state of the disk drive, the predetermined element including the voice coil motor driver;
   an auxiliary power supply independent of a power supply for the disk drive; and
   an emergency unload circuit configured to supply the voice coil motor with a current for retracting the head to the retract area, when the reset signal is asserted, the emergency unload circuit using the auxiliary power supply as an operation power supply thereof.

2. The disk drive according to claim 1, further comprising an OR gate which acquires a logical sum of the power-off detection signal and the drop detection signal, the reset circuit asserting the reset signal when an output signal of the OR gate assumes a logic level indicating "true".

3. The disk drive according to claim 1, wherein the auxiliary power supply includes a capacitor charged by the power supply for the disk drive.

4. The disk drive according to claim 3, further comprising a switch which connects/disconnects an end of the capacitor to/from a power supply line for supplying the power to the disk drive, the switch being turned off only when the reset signal is asserted.

5. A disk drive provided with a retract area to which a head is retracted, the head being used to read and write data from and to a disk, comprising:
   an actuator supporting the head such that the head is movable in a radial direction of the disk;
   a voice coil motor driver which drives a voice coil motor used as a drive source for the actuator;
   a reset circuit configured to assert a reset signal used to reset a predetermined element in the disk drive when a power-off detection signal indicating detection of interruption of supply of power to the disk drive is asserted, the predetermined element including the voice coil motor driver;
   an emergency unload designation circuit configured to assert an emergency unload designation signal when a drop detection signal indicating detection of a dropping state of the disk drive is asserted;
   an auxiliary power supply independent of a power supply for the disk drive; and
   an emergency unload circuit configured to be operative when at least one of the reset signal and the emergency unload designation signal is asserted, thereby supplying the voice coil motor with a current for retracting the head to the retract area, the emergency unload circuit using the auxiliary power supply as an operation power supply thereof when the reset signal is asserted, and using the power supply for the disk drive as the operation power supply when the reset signal is negated.

6. The disk drive according to claim 5, further comprising an OR gate which acquires a logical sum of the reset signal and the emergency unload designation signal, the emergency unload circuit being operative when an output signal of the OR gate assumes a logic level indicating "true".

7. The disk drive according to claim 5, wherein the auxiliary power supply includes a capacitor charged by the power supply for the disk drive.

8. The disk drive according to claim 7, further comprising a switch which connects/disconnects an end of the capacitor to/from a power supply line for supplying the power to the disk drive, the switch being turned off only when the reset signal is asserted.

9. The disk drive according to claim 5, wherein the emergency unload designation circuit asserts the emergency unload designation signal for a preset period after the drop detection signal is asserted.

10. The disk drive according to claim 5, further comprising a control unit configured to control read and write data from and to the disk, the control unit resuming writing of data to the disk, interrupted by head retraction, when the emergency unload designation signal is asserted in response to the drop detection signal during the writing of the data to the disk, then the head is retracted to the retract area, and an operation of the disk drive is resumed.

11. The disk drive according to claim 10, wherein the control unit includes:
an interruption processing device configured to execute interruption processing using the emergency unload designation signal as an interruption signal, when the emergency unload designation signal is asserted, the interruption processing device turning on a particular flag indicating that it is necessary to resume the writing of the data, when a cause of the interruption processing is the detection of the dropping state of the disk drive, and when the interruption processing is performed during the writing of the data; and
a determination device which determines whether the particular flag is in an ON state, when the operation of the disk drive is resumed,
the control unit resuming the writing of the data when the particular flag is in the ON state.

12. A disk drive provided with a retract area to which a head is retracted, the head being used to read and write data from and to a disk, comprising:
an actuator supporting the head such that the head is movable in a radial direction of the disk;
a voice coil motor driver which drives a voice coil motor used as a drive source for the actuator;
a reset circuit configured to assert a reset signal used to reset a predetermined element in the disk drive when a power-off detection signal indicating detection of interruption of supply of power to the disk drive is asserted, the predetermined element including the voice coil motor driver;
an emergency unload designation circuit configured to assert an emergency unload designation signal when a drop detection signal indicating detection of a dropping state of the disk drive is asserted;
an auxiliary power supply independent of a power supply for the disk drive; and
a first emergency unload circuit configured to supply the voice coil motor with a current for retracting the head to the retract area, when the reset signal is asserted, the first emergency unload circuit using the auxiliary power supply as an operation power supply thereof; and
a second emergency unload circuit configured to supply the voice coil motor with a current for retracting the head to the retract area, when the emergency unload designation signal is asserted, the second emergency unload circuit using the power supply for the disk drive as an operation power supply thereof.

13. The disk drive according to claim 12, wherein the auxiliary power supply includes a capacitor charged by the power supply for the disk drive.

14. The disk drive according to claim 13, further comprising a switch which connects/disconnects an end of the capacitor to/from a power supply line for supplying the power to the disk drive, the switch being turned off only when the reset signal is asserted.

15. The disk drive according to claim 12, wherein the second emergency unload circuit supplies a preset constant current to the voice coil motor.

16. The disk drive according to claim 12, wherein the emergency unload designation circuit asserts the emergency unload designation signal for a preset period after the drop detection signal is asserted.

17. The disk drive according to claim 12, further comprising a control unit configured to control read and write data from and to the disk, the control unit resuming writing of data to the disk, interrupted by head retraction, when the emergency unload designation signal is asserted in response to the drop detection signal during the writing of the data to the disk, then the head is retracted to the retract area, and an operation of the disk drive is resumed.

18. The disk drive according to claim 17, wherein the control unit includes:
an interruption processing device configured to execute interruption processing using the emergency unload designation signal as an interruption signal, when the emergency unload designation signal is asserted, the interruption processing device turning on a particular flag indicating that it is necessary to resume the writing of the data, when a cause of the interruption processing is the detection of the dropping state of the disk drive, and when the interruption processing is performed during the writing of the data; and
a determination device which determines whether the particular flag is in an ON state, when the operation of the disk drive is resumed,
the control unit resuming the writing of the data when the particular flag is in the ON state.

19. An emergency head-unload control circuit used in a disk drive for retracting, to a retract area, a head used to read and write data from and to a disk, the disk drive including an actuator supporting the head such that the head is movable in a radial direction of the disk, and a voice coil motor driver which drives a voice coil motor used as a drive source for the actuator, the emergency head-unload control circuit comprising:
a reset circuit configured to assert a reset signal used to reset a predetermined element in the disk drive when at least one of a power-off detection signal and a drop detection signal is asserted, the power-off detection signal indicating detection of interruption of supply of power to the disk drive, the drop detection signal indicating detection of a dropping state of the disk drive, the predetermined element including the voice coil motor driver;
an emergency unload circuit configured to supply the voice coil motor with a current for retracting the head to the retract area, when the reset signal is asserted, the emergency unload circuit using, as an operation power supply thereof, an auxiliary power supply independent of a power supply for the disk drive.

20. An emergency head-unload control circuit used in a disk drive for retracting, to a retract area, a head used to read and write data from and to a disk, the disk drive including an actuator supporting the head such that the head is movable in a radial direction of the disk, and a voice coil motor driver which drives a voice coil motor used as a drive source for the actuator, the emergency head-unload control circuit comprising:
a reset circuit configured to assert a reset signal used to reset a predetermined element in the disk drive when a power-off detection signal indicating detection of interruption of supply of power to the disk drive is asserted, the predetermined element including the voice coil motor driver;

an emergency unload designation circuit configured to assert an emergency unload designation signal when a drop detection signal indicating detection of a dropping state of the disk drive is asserted; and an emergency unload circuit configured to supply the voice coil motor with a current for retracting the head to the retract area, when at least one of the reset signal and the emergency unload designation signal is asserted, the emergency unload circuit using, as an operation power supply thereof, an auxiliary power supply independent of a power supply for the disk drive when the reset signal is asserted, the emergency unload circuit using the power supply for the disk drive as the operation power supply when the reset signal is negated.

21. An emergency head-unload control circuit used in a disk drive for retracting, to a retract area, a head used to read and write data from and to a disk, the disk drive including an actuator supporting the head such that the head is movable in a radial direction of the disk, and a voice coil motor driver which drives a voice coil motor used as a drive source for the actuator, the emergency head-unload control circuit comprising:

a reset circuit configured to assert a reset signal used to reset a predetermined element in the disk drive when a power-off detection signal indicating detection of interruption of supply of power to the disk drive is asserted, the predetermined element including the voice coil motor driver;

an emergency unload designation circuit configured to assert an emergency unload designation signal when a drop detection signal indicating detection of a dropping state of the disk drive is asserted;

a first emergency unload circuit configured to supply the voice coil motor with a current for retracting the head to the retract area, when the reset signal is asserted, the first emergency unload circuit using, as an operation power supply thereof, an auxiliary power supply independent of a power supply for the disk drive; and a second emergency unload circuit configured to supply the voice coil motor with a current for retracting the head to the retract area, when the emergency unload designation signal is asserted, the second emergency unload circuit using the power supply for the disk drive as an operation power supply thereof.

* * * * *